(12) United States Patent
Radzinski

(10) Patent No.: US 7,518,527 B2
(45) Date of Patent: Apr. 14, 2009

(54) EXTENDED RANGE EMF ANTENNA

(75) Inventor: Paul E Radzinski, Spring, TX (US)

(73) Assignee: Weatherford Canada Partnership, Edmonton (CA)

( * ) Notice: Subject to any disclaimer, the term of this patent is extended or adjusted under 35 U.S.C. 154(b) by 355 days.

(21) Appl. No.: 10/511,739

(22) PCT Filed: Apr. 16, 2003

(86) PCT No.: PCT/US03/11657

§ 371 (c)(1),
(2), (4) Date: Oct. 5, 2005

(87) PCT Pub. No.: WO03/090311

PCT Pub. Date: Oct. 30, 2003

(65) Prior Publication Data

US 2006/0066301 A1    Mar. 30, 2006

Related U.S. Application Data

(60) Provisional application No. 60/372,863, filed on Apr. 16, 2002.

(51) Int. Cl.
G01V 3/00      (2006.01)
(52) U.S. Cl. ............... 340/853.7; 340/854.4; 340/854.6; 175/40
(58) Field of Classification Search .............. 340/853.7, 340/854.4, 854.6; 175/40
See application file for complete search history.

(56) References Cited

U.S. PATENT DOCUMENTS

| | | | |
|---|---|---|---|
| 4,001,774 A * | 1/1977 | Dawson et al. | 340/854.6 |
| 5,394,141 A | 2/1995 | Soulier | |
| 5,816,344 A | 10/1998 | Turner | |
| 5,927,409 A | 7/1999 | Turner | |
| 6,223,826 B1 | 5/2001 | Chau et al. | |
| 6,367,564 B1 | 4/2002 | Mills et al. | |
| 6,655,464 B2 * | 12/2003 | Chau et al. | 166/380 |
| 6,970,099 B2 * | 11/2005 | Koro | 340/853.7 |

FOREIGN PATENT DOCUMENTS

| | | |
|---|---|---|
| EP | 0 273 379 | 7/1988 |
| GB | 2 299 915 | 10/1996 |
| WO | WO 01/20129 | 3/2001 |

OTHER PUBLICATIONS

Michael Horabik, International Search Report, Nov. 25, 2003, 1 page, USA.

Marot-Lassauzaie, J, Supplementary European Search Report, May 24, 2005, 1 page, Europe.

* cited by examiner

*Primary Examiner*—Timothy Edwards, Jr.
(74) *Attorney, Agent, or Firm*—Mark A. Oathout

(57) ABSTRACT

A measuring while drilling system typically has a metal pipework extending underground connected to an antenna. The metal pipework and the antenna are both connected to a type of downhole equipment. The antenna transmits or receives signals to/from a transceiver located on the surface, and the transceiver is connected to the metal pipeword and to a ground. The system is improved by joining a plurality of sections of wired drill pipe together to form a section where the antenna is integral with the metal pipework. One end of the section of wired drill pipe is joined to downhole equipment and another end is joined to a conventional metal pipework.

8 Claims, 2 Drawing Sheets

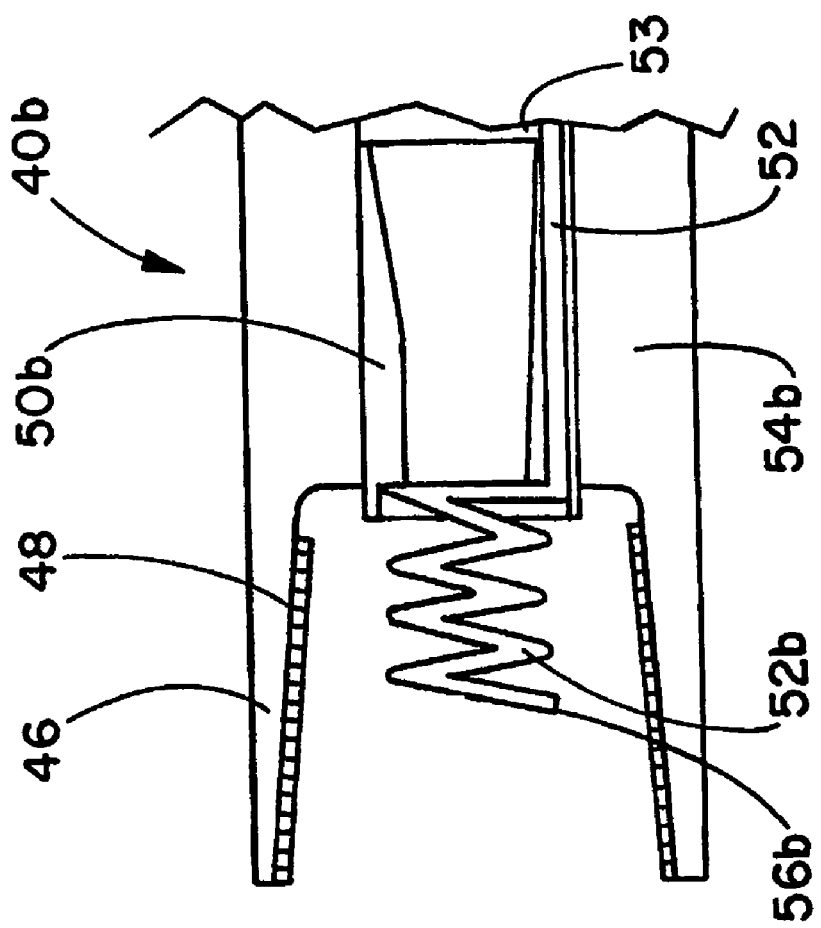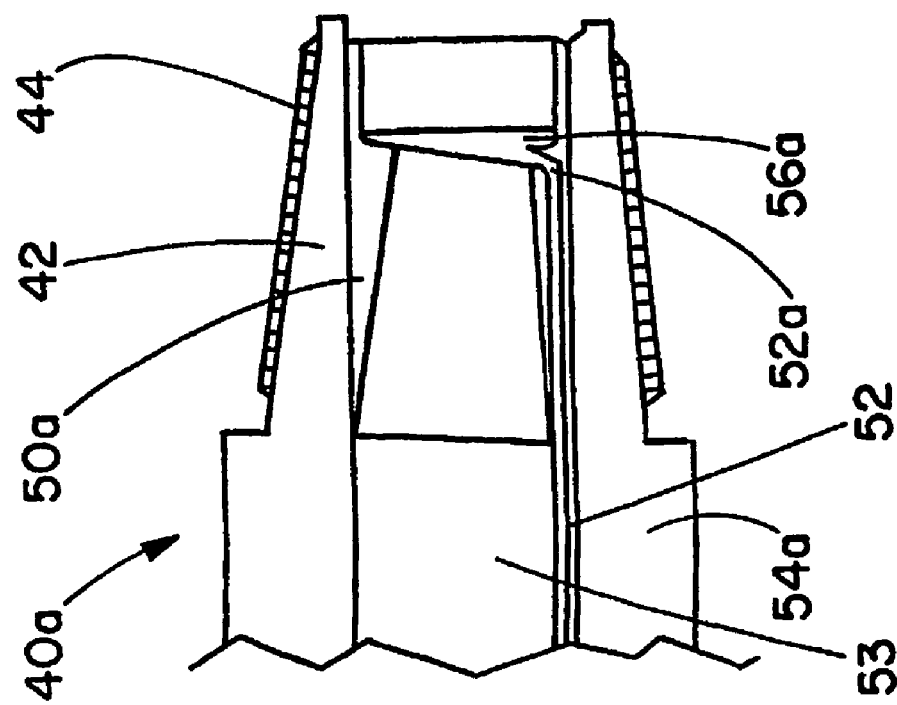
FIG. 2

EXTENDED RANGE EMF ANTENNA

CROSS-REFERENCE TO RELATED APPLICATIONS

This application claims the benefit of U.S. provisional application No. 60/372,863 filed Apr. 16, 2002.

STATEMENTS REGARDING FEDERALLY SPONSOR RESEARCH OR DEVELOPMENT

Not applicable.

REFERENCE TO A MICROFICHE APPENDIX

Not applicable.

BACKGROUND OF THE INVENTION

Description of the Related Art

The present application hereby incorporates by reference the teachings and disclosures of U.S. Pat. No. 5,394,141 issued Feb. 28, 1995 and of U.S. Pat. No. 6,223,826 issued May 1, 2001.

For purposes of this application, the following definition is intended to apply. The term "wired drill pipe" shall mean drill pipe sections having wire preinstalled and secured within the interior of the drill pipe section in a manner where a conductive path is formed through a like drill pipe section having preinstalled wire when the like drill pipe section is adjoined to the end of the preceding drill pipe section. A variety of embodiments thereof are described in U.S. Pat. No. 6,223,826 issued May 1, 2001, where such a device is generally referred to as the arrangement for providing an electrically conductive path installed in drill pipe sections having a threaded male end and a threaded female end.

BRIEF SUMMARY OF THE INVENTION

The present invention uses wired drill pipe to form a long dipole transmitting antenna such as the transmitter described in U.S. Pat. No. 5,394,141 issued Feb. 28, 1995, and uses such wired drill pipe for extended range (boosting) emf signaling in place of the wireline currently used for extended range signaling. The transmitter described in U.S. Pat. No. 5,394,141 is a running wire or wireline which dangles, for example, for 3,000 feet within the drill pipe and which is attached at both ends of such wire to the drill pipe.

Several advantages may be achieved by replacing such a wireline with the wired drill pipe. For example, the need for having pulleys and other devices at the surface for running wire into the drill pipe may be eliminated; the cost and complexity of installing the wireline within the drill pipe at the well site may be eliminated; downhole problems may be reduced like, for example, the risk for occurrences of wire breakage due to circumstances such as corrosion may be reduced; the time required to deploy the wireline within the drill pipe and to retract it from the drill pipe may be reduced or eliminated which may result in an overall reduction of the rig time required to perform a project; the overall system may be safer due to less complexity; and the wired drill pipe may be more reliable than the wireline.

One type of a measuring while drilling system typically has a metal pipework extending underground connected to an antenna. The metal pipework and the antenna are both connected to downhole equipment. The antenna transmits or receives signals to/from a transceiver located on the surface, and the transceiver is connected to the metal pipework and to a ground. The system is improved by joining a plurality of sections of wired drill pipe together to form a section where the antenna is integral with the metal pipework. One end of the section of wired drill pipe is joined to downhole equipment and another end is joined to a conventional metal pipework.

BRIEF DESCRIPTION OF THE SEVERAL VIEWS OF THE DRAWINGS

FIG. 2 is a sectional view of a male end of a piece of wired drill pipe nearly connected to a female end of a like piece of wired drill pipe.

DETAILED DESCRIPTION OF THE INVENTION

Figure 1:
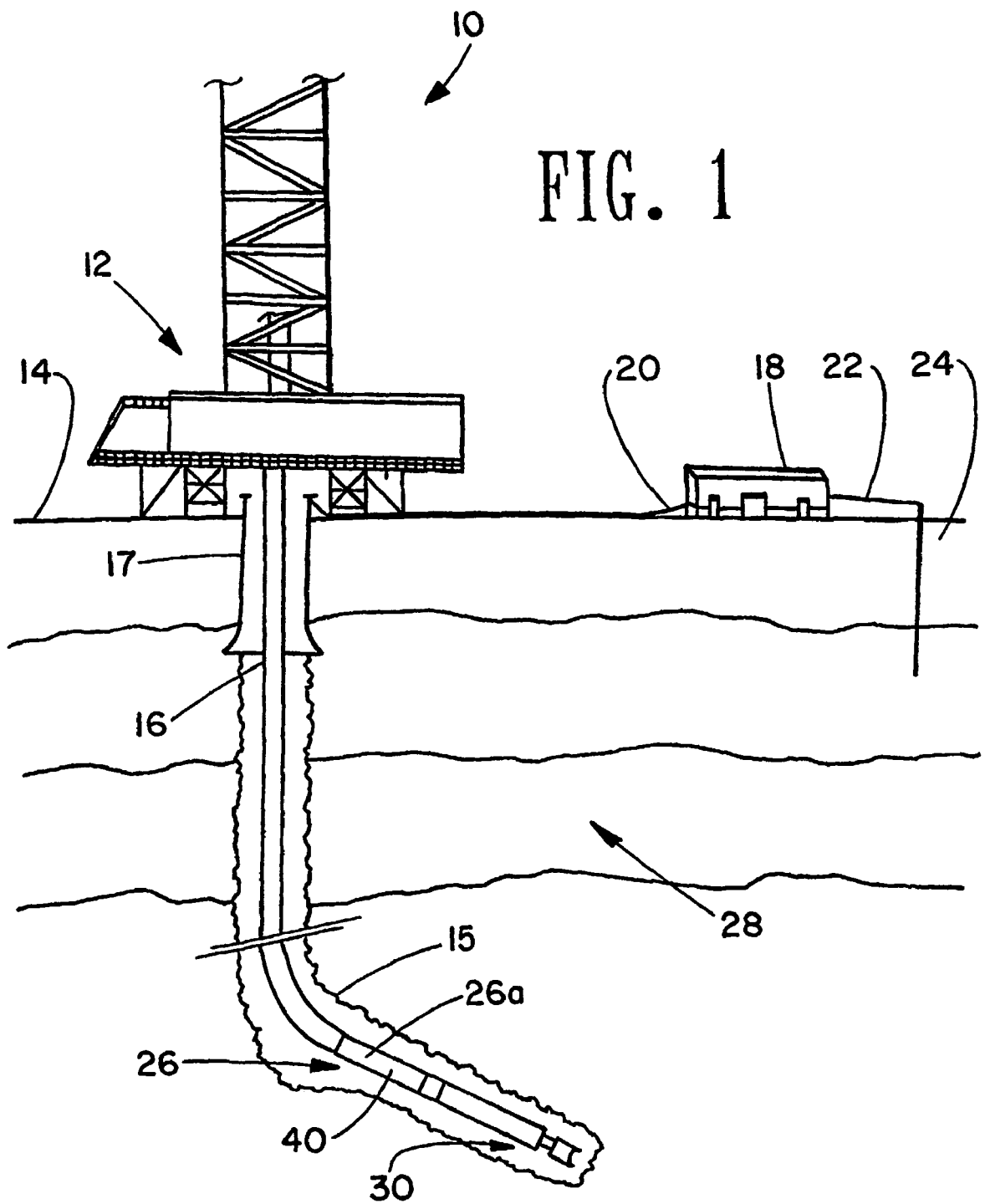
FIG. 1 is a schematic elevational view of a measuring while drilling operation.

FIG. 1 shows a schematic of a typical measuring while drilling operation 10 having a rig 12 on the surface 14 for drilling an open hole 15. Conventional metal pipework or drill pipe 16 and a length of casing 17 emanates from the rig 12. A transceiver 18 is also located at the surface and is connected by a line 20 to the casing 17 (or by some means to any pipe in the well) and by a line 22 to the ground 24 (which may be the surface 14 or at a position below the ocean). The transceiver 18 can send or receive signals from a transmitter/receiver device 26 which transmits/receives emf signals which emanate through the earth 28 for transmission/reception of directional data, gamma ray data, resistivity data, annular pressure data, etc. Additional details of such a system are described in U.S. Pat. No. 5,394,141.

In the present telemetry embodiment(s), for purposes of the transmitter/receiver device 26, one or more sections of wired drill pipe 40 are connected at one end to some type of downhole equipment 30 as the downhole equipment 30 is lowered below the surface 14. The other end of the wired drill pipe 40 is joined to the metal pipework 16. The sections of wired drill pipe 40 form an antenna 26a (which may be a transmitter and/or receiver) and a section of drill pipe bridging the conventional metal pipework 16 to the downhole equipment 30.

FIG. 2 shows one embodiment of the male end 42 with threading 44 and the female end 46 with threading 48 of respective wired drill pipe sections 40a and 40b. Several other embodiments are described in U.S. Pat. No. 6,223,826. The wired drill pipe 40 is constructed with mounting devices 50a and 50b for mounting and securing wire(s) 52a,b respectively within or inside the drill pipe casings 54a and 54b. In the embodiment shown, the respective ends 56a and 56b of the wires 52a and 52b are curled like a halo such that wires 52a and 52b meet to form a conductive path when the male end 42 is joined to the female end 46. Other details/embodiments of wired drill pipe 40 are described in U.S. Pat. No. 6,223,826. Further embodiments of wired drill pipe which could be incorporated into various embodiments of the invention include wire(s) 52 built or embedded into the wall 53 of the drill pipe casings 54a and 54b such that the pipe wall 53 and the wire 52 are unitary, such as, for example, wire(s) 52 inserted into a groove formed in the wall 53 of the drill pipe (preferably on the inside of the wall 53). In another embodiment wire(s) 52 may lay alongside (or dangle freely) in the bore of the drill pipe casings 54a and 54b.

The wires 52 are preferably insulated to create an electrically isolated conductive path and may, for example, have a $3/16^{th}$ inch diameter or a diameter as needed to function as the antenna 26a.

The wired drill pipe sections 40 may be joined together to form an integral pipework casing and antenna 26a of any desirable length. Normally, the wired drill pipe sections 40 will be joined together to form an antenna 26a ranging from 2,000 to 5,000 feet in length for extended range signaling. However, for downhole depths of 18,000 feet, the wired drill pipe sections 40 could be joined to form an antenna 26a which is, for example, 9,000 feet long. It is to be understood that the antenna 26a could be longer than 9,000 feet or shorter than 2,000 feet if necessary or desired. Preferably, the lower end of the antenna 26a is communicatively connected to the downhole equipment 30 instruments/sensors and the upper end of the antenna 26a is electronically connected to the pipe 16, although other known connections may be implemented.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

I claim:

1. In a method for telemetering information between a type of down hole equipment at a bottom of an operation and a surface, comprising the steps of:
    providing a transceiver at the surface;
    installing one end of a section of wired drill pipe on a type of downhole equipment;
    installing a conventional metal pipework to the other end of the section of wired drill pipe;
    using the section of wired drill pipe as a long dipole antenna for a well operation located below a surface from which the conventional metal pipework emanates and providing the long dipole antenna proximate the downhole equipment at the bottom of the operation; and
    transmitting from the section of wired drill pipe forming the long dipole antenna to the transceiver at the surface for extended range emf signaling.

2. The method according to claim 1 wherein the section of wired drill pipe is a first section of wired drill pipe, further including the step of attaching a second section of wired drill pipe to the first section of wired drill pipe for connection between the downhole equipment and the conventional metal pipework.

3. The method according to claim 2, further including joining additional sections of wired drill pipe for forming an antenna having a length ranging from 2,000 to 5,000 feet.

4. The method according to claim 2, further including joining additional sections of wired drill pipe for forming an antenna having a length ranging from 2,000 to 9,000 feet.

5. In an apparatus for telemetering information between a type of downhole equipment at a bottom of an operation and a surface, the improvement comprising:
    a transceiver at the surface connected to both a ground, spaced from the operation;
    a conventional metal pipework, the conventional metal pipework emanating from a rig at the surface;
    a plurality of sections of wired drill pipe joined together to form a long dipole antenna for applying signals between two points, wherein one end of said plurality of sections of wired drill pipe is connected to the conventional metal pipework;
    a type of downhole equipment connected to the other end of said plurality of sections of wired drill pipe.

6. The apparatus according to claim 5, wherein the length of said plurality of sections of wired drill pipe joined together is a constant ranging from 2,000 to 9,000 feet.

7. The apparatus according to claim 5, wherein the length of said plurality of sections of wired drill pipe joined together is a constant ranging from 2,000 to 5,000 feet.

8. The apparatus according to claim 5 wherein said plurality of sections of wired drill pipe include a drill pipe casing with a wall; and a wire embedded into the wall of the drill pipe casing.

* * * * *